(12) United States Patent
Bernasconi

(10) Patent No.: US 11,565,955 B2
(45) Date of Patent: Jan. 31, 2023

(54) CONDENSATE NEUTRALIZER

(71) Applicant: Michael Charles Bernasconi, Bridgewater, MA (US)

(72) Inventor: Michael Charles Bernasconi, Bridgewater, MA (US)

(73) Assignee: Neutrasafe LLC, Randolph, MA (US)

( * ) Notice: Subject to any disclaimer, the term of this patent is extended or adjusted under 35 U.S.C. 154(b) by 576 days.

(21) Appl. No.: 16/585,690

(22) Filed: Sep. 27, 2019

(65) Prior Publication Data
US 2020/0103141 A1  Apr. 2, 2020

Related U.S. Application Data

(60) Provisional application No. 62/738,340, filed on Sep. 28, 2018.

(51) Int. Cl.
*F24H 8/00* (2022.01)
*C02F 1/66* (2006.01)
*C02F 103/02* (2006.01)

(52) U.S. Cl.
CPC .............. *C02F 1/66* (2013.01); *F24H 8/006* (2013.01); *C02F 2103/02* (2013.01); *C02F 2209/06* (2013.01)

(58) Field of Classification Search
None
See application file for complete search history.

(56) References Cited

U.S. PATENT DOCUMENTS

| | | |
|---|---|---|
| 3,430,693 A | 3/1969 | Egenvall |
| 4,289,730 A | 9/1981 | Tomlinson |
| 4,309,947 A | 1/1982 | Ketterer |
| 4,366,106 A | 12/1982 | Benyak et al. |
| 5,178,124 A | 1/1993 | Lu et al. |
| 5,346,001 A | 9/1994 | Rieke et al. |
| 5,384,106 A | 1/1995 | Johnson |
| 6,006,741 A | 12/1999 | Daddis, Jr. |
| RE37,040 E | 2/2001 | Hughes et al. |
| 6,878,334 B2 | 4/2005 | Otter |
| 7,334,631 B2 | 2/2008 | Kato et al. |
| 7,758,819 B2 | 7/2010 | Nagelhout |

(Continued)

FOREIGN PATENT DOCUMENTS

| | | | | | |
|---|---|---|---|---|---|
| JP | 2006102617 A | * | 4/2006 | ............. | F24H 8/006 |
| WO | WO-2009024126 A1 | * | 2/2009 | ................ | C02F 1/66 |

OTHER PUBLICATIONS

Hitoshi et al. JP 2006-102617 A, machine translation (Year: 2006).*
Freigeber, WO 2009/024126 A1, machine translation (Year: 2009).*

*Primary Examiner* — Wojciech Haske

(74) *Attorney, Agent, or Firm* — Dunlap Bennett & Ludwig, PLLC

(57) ABSTRACT

A condensate chamber is a housing having an inlet, an outlet, a base, a top wall, and upstanding sidewalls. The upstanding sidewalls include a first end sidewall, a second end sidewall, a first side sidewall, and a second side sidewall. A divider is disposed within the housing and includes a proximal end disposed against the first end sidewall and extends towards the second end sidewall. A gap is defined in between a distal end of the divider and the second end sidewall. The divider defines a serpentine channel within the housing starting at the inlet and ending at the outlet.

18 Claims, 4 Drawing Sheets

(56) References Cited

U.S. PATENT DOCUMENTS

| | | |
|---|---|---|
| 8,307,669 B2 | 11/2012 | Taras et al. |
| 8,826,901 B2 | 9/2014 | Haydock et al. |
| 9,908,205 B2 | 3/2018 | Zimmer et al. |
| 9,968,884 B2 | 5/2018 | Stuhler et al. |

* cited by examiner

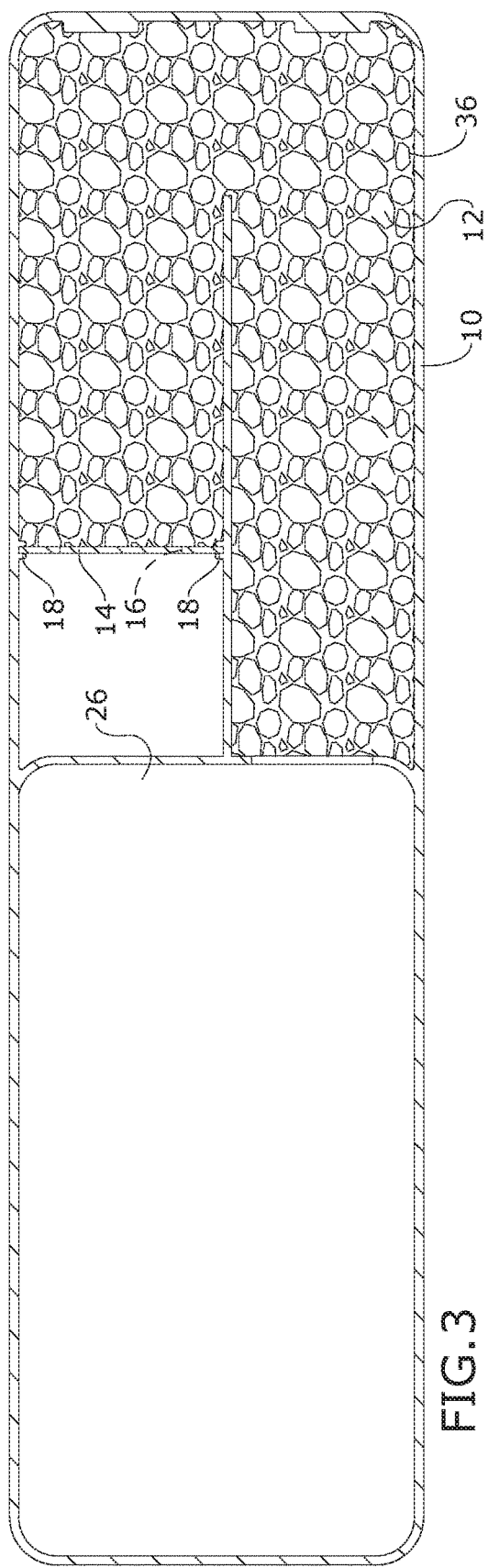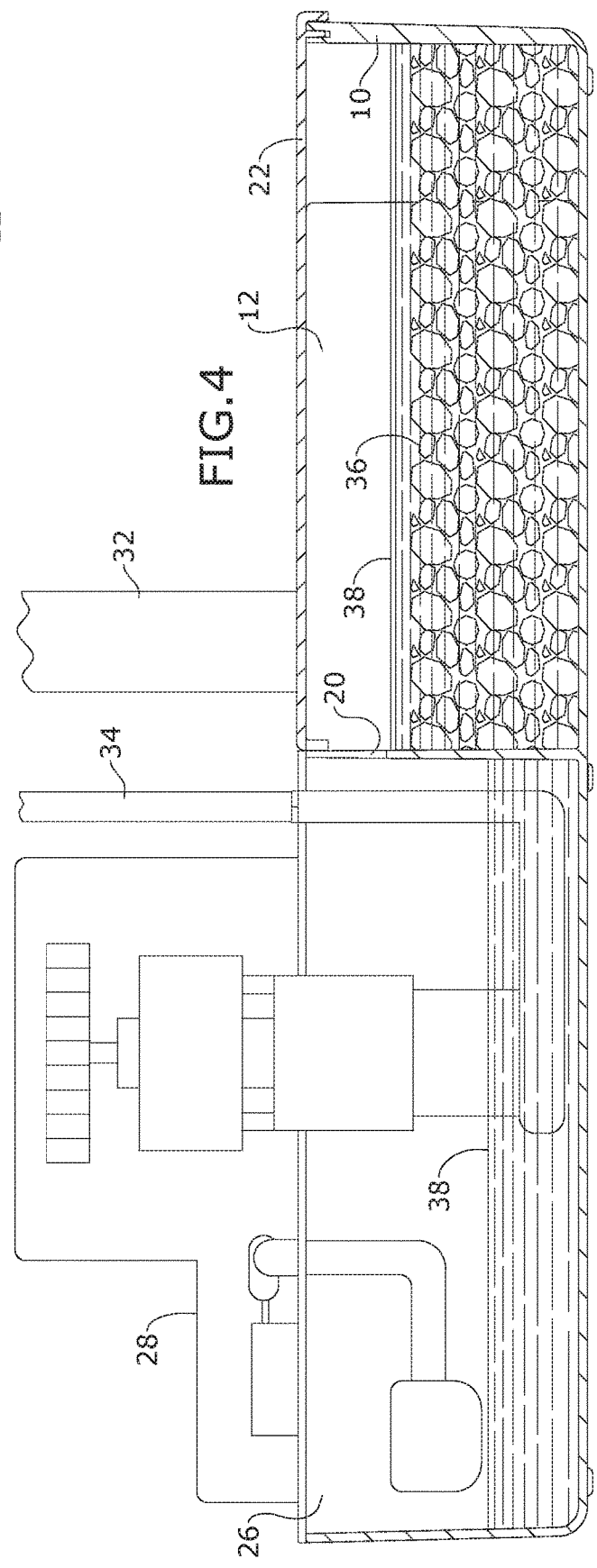

CONDENSATE NEUTRALIZER

CROSS-REFERENCE TO RELATED APPLICATION

This application claims the benefit of priority of U.S. provisional application No. 62/738,340, filed Sep. 28, 2018, the contents of which are herein incorporated by reference.

BACKGROUND OF THE INVENTION

The present invention relates to condensate neutralizer and, more particularly, to a condensate neutralizer with a serpentine flow for increased performance.

Condensing boilers are water heaters fueled by gas or oil. They achieve high efficiency (typically greater than 90% on the higher heating value) by using waste heat in flue gases to pre-heat cold water entering the boiler. Water vapor produced during combustion is condensed into liquid form, which leaves the system via a drain.

The condensate expelled from a condensing boiler is acidic, with a pH between 2 and 4. Condensing boilers require a drainpipe for the condensate produced during operation. This consists of a short length of polymer pipe with a vapor trap to prevent exhaust gases from being expelled into the building. The acidic nature of the condensate may be corrosive to cast iron plumbing, waste pipes and concrete floors but poses no health risk to occupants. A neutralizer, typically consisting of a plastic container filled with marble or limestone aggregate or "chips" (alkaline) can be installed to raise the pH to acceptable levels.

As can be seen, there is a need for condensate neutralizers with higher efficiency.

SUMMARY OF THE INVENTION

In one aspect of the present invention, a condensate chamber comprises: a housing comprising an inlet, an outlet, a base, a top wall, and upstanding sidewalls, the upstanding sidewalls comprising a first end sidewall, a second end sidewall, a first side sidewall, and a second side sidewall; and a divider disposed within the housing and comprising a proximal end disposed against the first end sidewall, the divider extending towards the second end sidewall, wherein a gap is defined in between a distal end of the divider and the second end sidewall, wherein the divider defines a serpentine channel within the housing starting at the inlet and ending at the outlet.

These and other features, aspects and advantages of the present invention will become better understood with reference to the following drawings, description and claims.

BRIEF DESCRIPTION OF THE DRAWINGS

FIG. 3 is a section view of the present invention, taken along line 3-3 in FIG. 1;

FIG. 4 is a section view of the present invention, taken along line 4-4 in FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
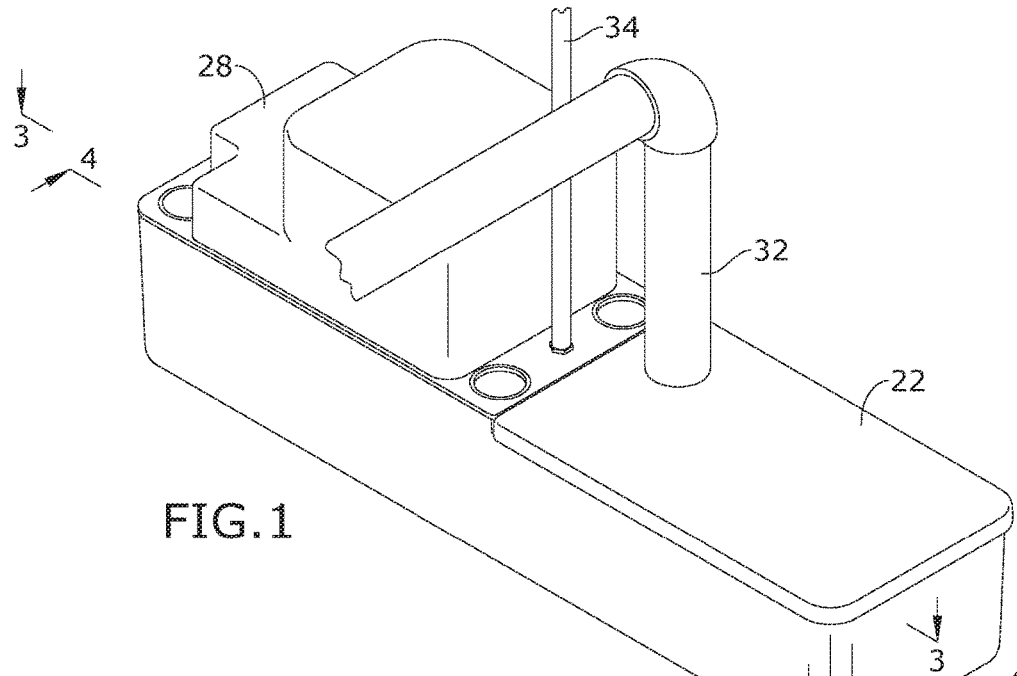
FIG. 1 is a perspective view of an embodiment of the present invention.
Figure 2:
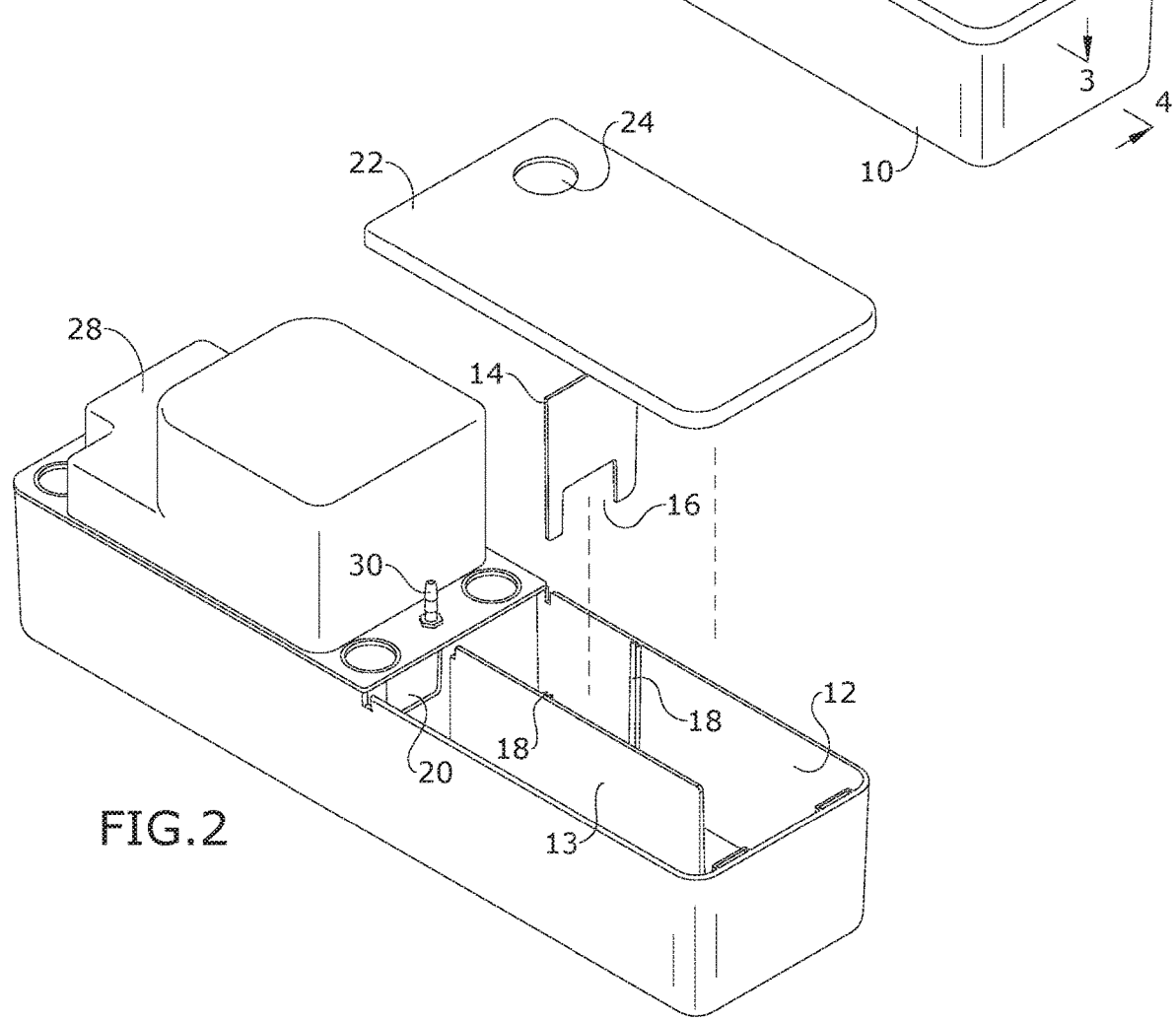
FIG. 2 is an exploded view of an embodiment of the present invention.

Referring to FIGS. 1 through 4, the present invention includes a condensate chamber. The condensate chamber is a housing 10 having an inlet 24, an outlet 20, a base, a top wall 22, and upstanding sidewalls. The upstanding sidewalls include a first end sidewall, a second end sidewall, a first side sidewall, and a second side sidewall. A divider 13 is disposed within the housing 10 and includes a proximal end disposed against the first end sidewall and extends towards the second end sidewall. A gap is defined in between a distal end of the divider 13 and the second end sidewall. The divider 13 defines a serpentine channel 12 within the housing 10 starting at the inlet 24 and ending at the outlet 20.

In certain embodiments, the top wall 22 is a lid removeably attached to upper edges of the upstanding sidewalls. The inlet 24 may be defined through the top wall and the outlet may be defined through the first end sidewall. An input pipe 32 is coupled to the inlet 24.

The present invention may further include an inlet chamber divider 14 disposed within the housing 10. The inlet chamber divider 14 may secure within internal slots 18 of the housing 10. The inlet chamber divider 14 include an opening 16 for allowing fluid to flow through. The opening 16 of the inlet chamber divider 14 is defined by an inner edge of the inlet chamber divider 14 and the base. The inlet chamber divider 14 includes a first side edge disposed against the divider and a second side edge disposed against the first side wall. An inlet chamber is defined in between the inlet divider, the divider, the first end sidewall and the first side sidewall. The serpentine channel 12 starts at the inlet chamber.

In certain embodiments, a pump 28 may be coupled to the condensate chamber. A pump chamber 26 includes an inlet and an outlet 30. The inlet receives fluid from the outlet 30 of the housing 10. The pump 28 is coupled to the pump chamber 26 and is configured to pump the fluid 38 from the pump chamber 26 to the outlet 30 of the pump chamber 26. The outlet 30 of the pump chamber 26 may include a hose fitting and a hose 34 is coupled to the hose fitting.

The condensate neutralizer is installed between the outlet drain of a condensing appliance and the building drain or point of disposal. A plurality of chips 36 are disposed within the housing 10. The condensate fluid 38 travels into the inlet 24, travels around the divider 13 and exits through the outlet 20. The present invention provides for a more efficient condensate neutralizer as the condensate has to travel through more chips 36.

Figure 5:
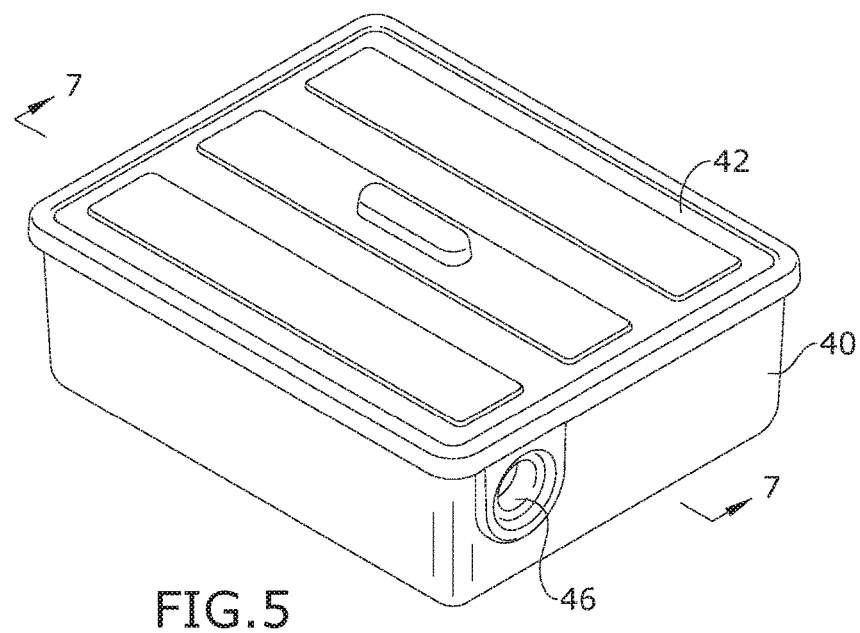
FIG. 5 is a perspective view of an embodiment of the present invention.
Figure 6:
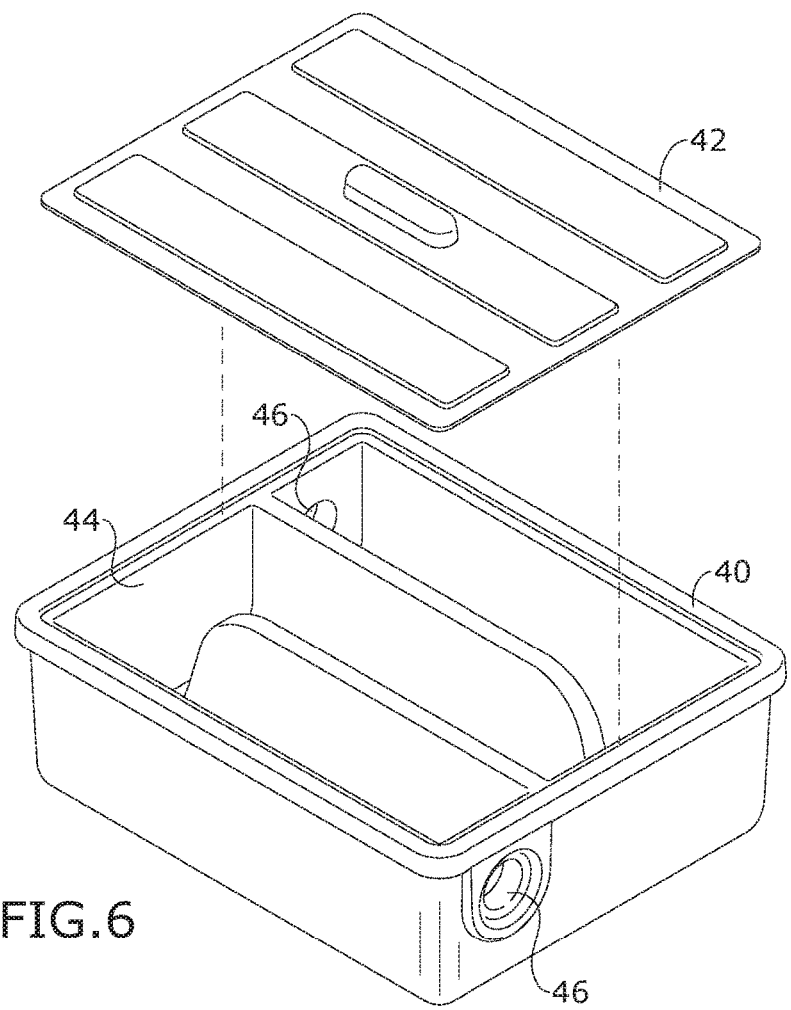
FIG. 6 is an exploded view of an embodiment of the present invention.
Figure 7:
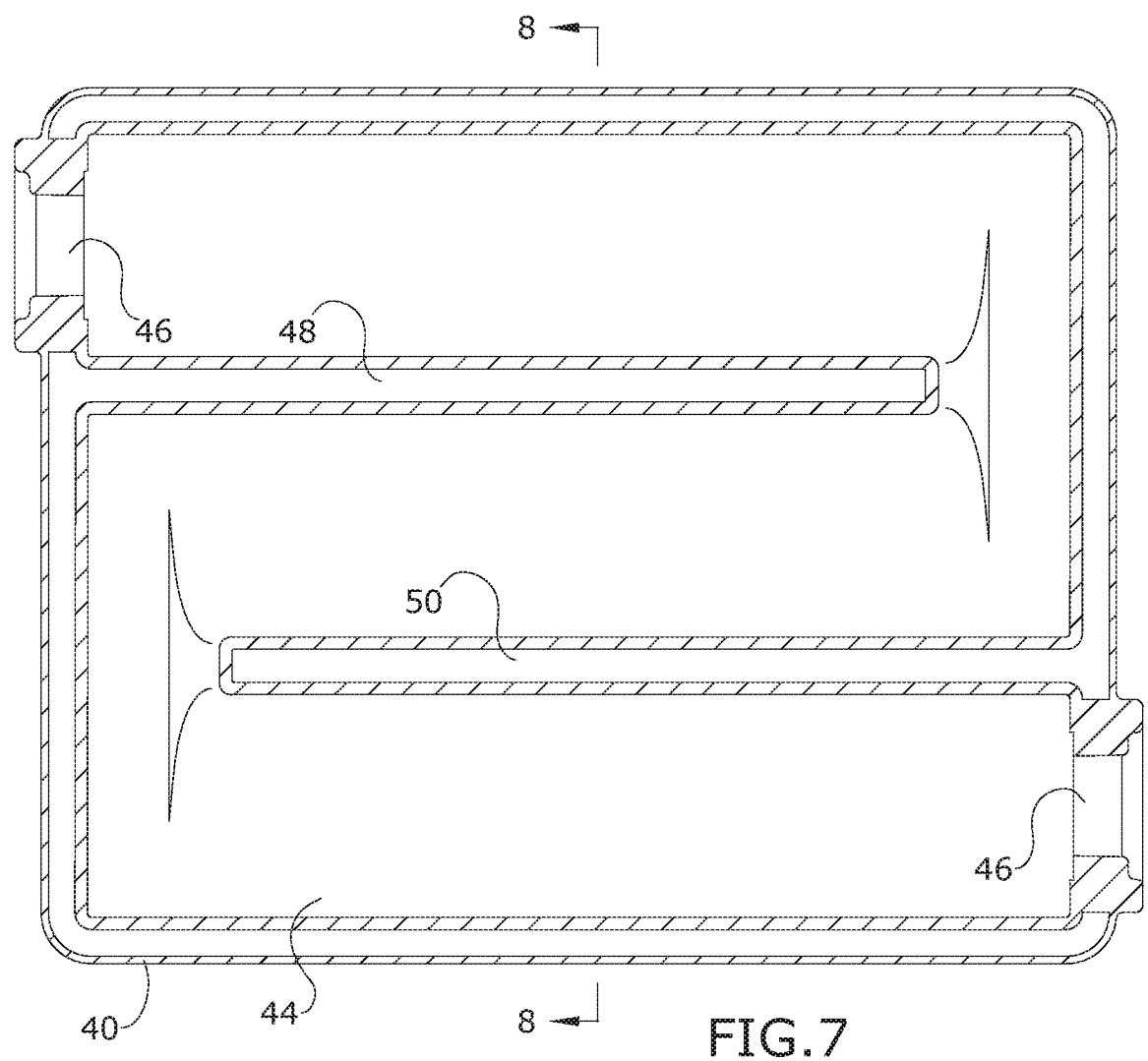
FIG. 7 is a section view of the present invention, taken along line 7-7 in FIG. 5.
Figure 8:
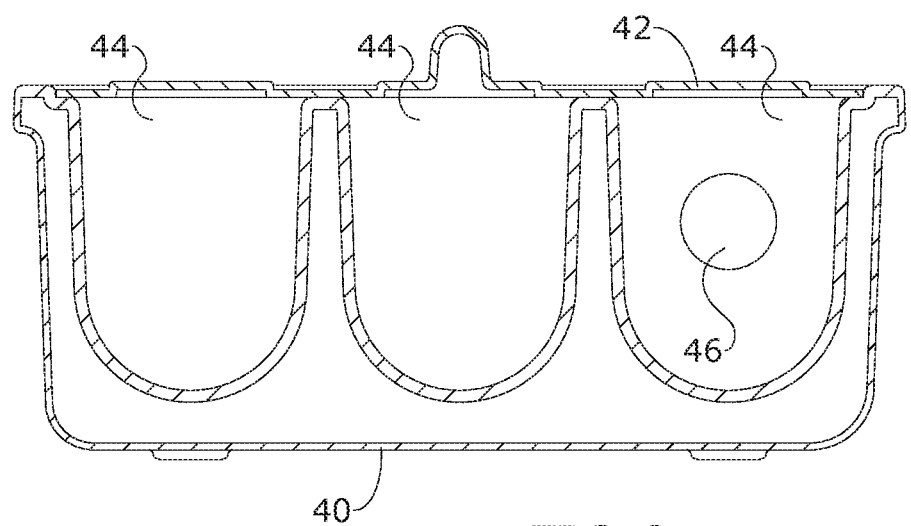
FIG. 8 is a section view of the present invention, taken along line 8-8 in FIG. 7.

Referring to FIGS. 5 through 8, the condensate chamber of the present invention includes a housing 40. The housing 40 includes an inlet 46, an outlet 46, a base, a top wall 42, and upstanding sidewalls. The upstanding sidewalls include a first end sidewall, a second end sidewall, a first side sidewall, and a second side sidewall. A first divider 48 is disposed within the housing 10 and includes a proximal end disposed against the first end sidewall and extends towards the second end sidewall. A gap is defined in between a distal end of the first divider 48 and the second end sidewall. A second divider 50 is disposed within the housing 40 and includes a proximal end disposed against the second end sidewall and extends towards the first end sidewall. A gap is defined in between a distal end of the second divider 50 and the first end sidewall. The first divider 48 and the second divider 50 define a serpentine channel 44 within the housing 40 starting at the inlet 46 and ending at the outlet 46. In such embodiments, the inlet 46 is defined through the first end sidewall and the outlet 46 is defined through the second end sidewall. The inlet 46 may be directed upwards and the fluid may flow downwards through the serpentine channel 44 and out of the outlet 46.

Each vessel is designed with a serpentine flow through it using partitions and openings between the inlet and outlet. Condensate enters from the inlet of the device and then flows through the channels back and forth to the outlet. The whole time it is flowing back and forth it is exposed to the neutralization media. Typical manufacturing process could be injection molding or roto molding although other processes are possible.

It should be understood, of course, that the foregoing relates to exemplary embodiments of the invention and that modifications may be made without departing from the spirit and scope of the invention as set forth in the following claims.

What is claimed is:

1. A condensate chamber comprising:
a housing comprising an inlet, an outlet, a base, a top wall, and upstanding sidewalls, the upstanding sidewalls comprising a first end sidewall, a second end sidewall, a first side sidewall, and a second side sidewall;
a divider disposed within the housing and comprising a proximal end disposed against the first end sidewall, the divider extending towards the second end sidewall, wherein a gap is defined in between a distal end of the divider and the second end sidewall, wherein the divider defines a serpentine channel within the housing; and
an inlet chamber divider disposed within the housing and comprising: an opening defined by a first side edge disposed against the divider and a second side edge disposed against the first side sidewall, wherein an inlet chamber is defined in between the inlet chamber divider, the divider, the first end sidewall and the first side sidewall, wherein the inlet chamber divider is removably secured by opposing internal slots along the divider and the first end sidewall, respectively,
wherein the serpentine channel starts at the inlet chamber and ends at the outlet.

2. The condensate chamber of claim 1, wherein the top wall is a lid removeably attached to upper edges of the upstanding sidewalls.

3. The condensate chamber of claim 1, further comprising an input pipe coupled to the inlet.

4. The condensate chamber of claim 1, further comprising a second divider disposed within the housing and comprising a proximal end disposed against the second end sidewall, the second divider extending towards the first end sidewall, wherein a second gap is defined in between a distal end of the second divider and the first end sidewall.

5. The condensate chamber of claim 4, wherein the inlet is defined through the first end sidewall and the outlet is defined through the second end sidewall.

6. The condensate chamber of claim 1, wherein the inlet is defined through the top wall and the outlet is defined through the first end sidewall.

7. The condensate chamber of claim 1, wherein an inlet chamber is devoid of structure between the inlet chamber divider, the divider, the first end sidewall, the base, the top wall and the first side sidewall.

8. The condensate chamber of claim 7, wherein an opening of the inlet chamber divider is defined by an inner edge of the inlet chamber divider and the base.

9. The condensate chamber of claim 1, further comprising:
a pump chamber comprising a pump inlet and a pump outlet, wherein the pump inlet receives fluid from the outlet of the housing; and
a pump coupled to the pump chamber and configured to pump the fluid from the pump chamber to the outlet of the pump chamber.

10. The condensate chamber of claim 9, wherein the pump outlet comprises a hose fitting and a hose is coupled to the hose fitting.

11. A condensate chamber for operatively associating with a condensing boiler having a vertically oriented drainpipe relative to a supporting surface, the condensate chamber comprising:
a neutralization housing comprising:
an inlet, an outlet, a base, a top wall, and upstanding sidewalls, the upstanding sidewalls comprising a first end sidewall, a second end sidewall, a first side sidewall, and a second side sidewall, wherein the base is supported on the supporting surface;
a divider disposed within the neutralization housing and comprising a proximal end disposed against the first end sidewall, the divider extending towards the second end sidewall, wherein a gap is defined in between a distal end of the divider and the second end sidewall, wherein the divider defines a serpentine channel; and
an inlet chamber divider movable between a removed condition and a disposed condition within the neutralization housing, the inlet chamber divider comprising an opening, a first side edge disposed against the divider and a second side edge disposed against the first side sidewall, wherein an inlet chamber is defined in between the inlet chamber divider in the disposed condition, the divider, the first end sidewall and the first side sidewall, wherein the serpentine channel starts at the inlet chamber in the disposed condition, and wherein the serpentine channel starts at the inlet in the removed condition.

12. The condensate chamber of claim 11, wherein the inlet is defined through the top wall and the outlet is defined through the first end sidewall, wherein the inlet couples to a distal end of the vertically oriented drainpipe, and wherein the inlet is disposed directly vertical relative the inlet chamber,
whereby a discharge of the vertically oriented drainpipe flows into the inlet chamber in the disposed condition.

13. The condensate chamber of claim 12, wherein the inlet chamber divider is removably secured by opposing internal slots along the divider and the first end sidewall, respectively.

14. The condensate chamber of claim 12, further comprising:
a pump chamber on an opposing side of the first end sidewall, the pump chamber comprising a pump inlet and a pump outlet, wherein the pump inlet receives fluid from the outlet of the neutralization housing; and a pump coupled to the pump chamber and configured to pump the fluid from the pump inlet to the outlet of the pump chamber.

15. The condensate chamber of claim 14, wherein the pump outlet is more proximal to the inlet of the neutralization housing than the outlet of the neutralization housing.

16. The condensate chamber of claim 15, wherein the pump outlet comprises a hose fitting and a hose is coupled to the hose fitting, wherein the hose fitting extends parallel with the vertical oriented drainpipe.

17. The condensate chamber of claim 16, wherein the pump chamber shares the base and the pump is above the base, whereby the condensate chamber maintains a low vertical profile.

18. The condensate chamber of claim 17, wherein an inlet chamber is devoid of structure between the inlet chamber divider, the divider, the first end sidewall, the base, the top wall and the first side sidewall.

* * * * *